United States Patent Office 3,300,444
Patented Jan. 24, 1967

3,300,444
POLYMERIC POLYCARBOXYLIC ACIDS
Sylvan O. Greenlee, Racine, Wis., assignor to
S. C. Johnson & Son, Inc., Racine, Wis.
No Drawing. Filed Oct. 3, 1955, Ser. No. 538,245
14 Claims. (Cl. 260—47)

This invention relates to a new class of polycarboxylic acids. More particularly this invention relates to the polymeric condensation products of diaryloxy-substituted acids and coupling agents which are bifunctional with respect to aromatic hydroxyl groups.

An object of this invention is to provide a novel class of resinous acids having high melting points.

Another object of this invention is to provide a novel class of resinous compositions, having high acid values, which are capable of further modifiication to suit a particular need.

A specific object of this invention is to provide a new polymeric polycarboxylic acid by condensing an hydroxyarlyl-substituted acid with a coupling agent which contains at least two reactive groups capable of forming an ether linkage with an aromatic hydroxyl group.

The preferred products of the invention are polymeric polycarboxyl organic acids which contain a number of molecules of bis(arylene)-substituted aliphatic acid coupled to one another through ether oxygen by alkylene or substituted alkylene radicals. Such compositions may be prepared, for example, by heating a bis(hydroxyaryl)-substituted aliphatic acid such as 4,4-bis(4-hydroxyphenyl)-pentanoic acid, in the presence of alkali, with a difunctional coupling agent such as a dihalohydrin, dihalide, or an epihalohydrin. Illustrative possible polycarboxylic acids are the following:

4,4-bis(hydroxyphenyl)-pentanoic acid + dichlorobutene

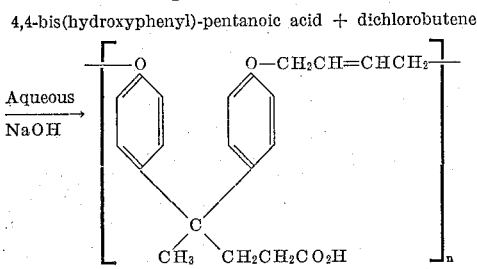

4,4-bis(4-hydroxyphenyl)-pentanoic acid + dichlorodiethyl ether

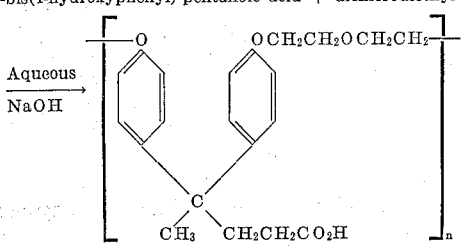

4,4-bis(4-hydroxyphenyl)-pentanoic acid + epichlorohydrin

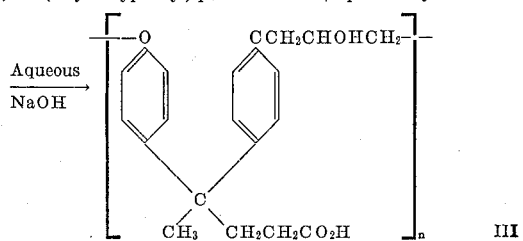

4,4-bis(4-hydroxyphenyl)-pentanoic acid + bis(4-hydroxyphenyl)-isopropylidene + 1,4-dichlorobutane

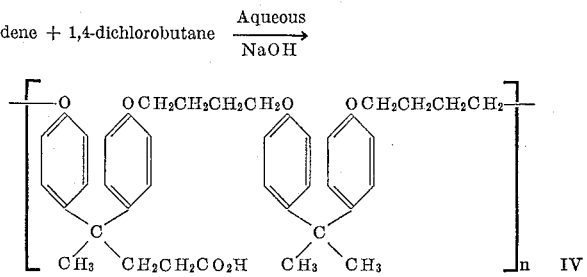

wherein the value of $n$, indicating the degree of polymerization, depends on the quantities of reactants employed but has been found to represent a value of less than about 15. The compound shown at IV illustrates one method of obtaining a lower acid number should it be necessary for a particular use.

The end groups in all of the above polycarboxylic acids will vary depending on the ratio of hydroxyaryl-substituted acid to aliphatic coupling agent. If excess of the former is used, for example, in reaction with dichlorobutene, the end groups will be phenolic hydroxyl groups. If, on the other hand, dichlorobutene is used in excess, the end groups will be chlorobutene groups.

The aryloxy-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal carbon atom in order to obtain satisfactory yields. It is to be understood that the terminal carbon atom referred to is a primary carbon atom, i.e., one having three hydrogen atoms attached thereto. Prior application, Serial Nos. 464,607 and 489,300, filed October 25, 1954, and February 18, 1955, both now abandoned, respectively, disclose a number of illustrative compounds suitable for use as the aryloxy-substituted acid and methods of preparing the same. These materials, which are referred to for convenience as diphenolic acids or DPA, consist of the condensation products of levulinic acid and phenol, substituted phenols, or mixtures thereof. It is to be understood that the phenolic nuclei of the diphenolic acids may be substituted with any groups which will not interfere with the reactions contemplated. For example, the nuclei may be alkylated with alkyl groups of from 1–5 carbon atoms as disclosed in my copending application Serial No. 489,300 or they may be halogenated. The diphenolic acids derived from substituted phenols, such as the alkylated phenols, are sometimes more desirable than the products obtained from unsubstituted phenols since the alkyl groups provide better organic solvent solubility, flexibility, and water-resistance. However, the unsubstituted product is usually more readily purified.

The coupling agents advantageously used in building up the desired molecular structure of the subject resinous polycarboxylic acids must be bifunctional in their reactions with phenolic hydroxyl groups in the presence of alkali. Exemplary coupling agents having this characteristic are the aliphatic dihalides. The reaction of a phenolic hydroxyl group with an alkyl halide forms an ether linkage by the well known Williamson synthesis, employing an alkali metal phenoxide:

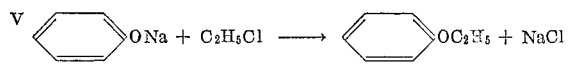

Similarly, the use of a dihalide and a dihydric phenol results in a polymeric structure having alternating aryl and alkyl nuclei joined to one another by ether oxygen linkages.

It should thus be apparent that virtually any dihalide constitutes a suitable coupling agent for present purposes, provided that it contain no substituents which will interfere with the etherification reaction. Illustrative dihalides are 1,2-dichloroethane, 1,3-dichloropropane, 1,4-dichlorobutane, 1,4-dichlorobutene, glycerol dichlorohydrin, the oxy-dihalides wherein one of the carbon atoms is replaced by oxygen or is hydroxylated, such as the alkylene halohydrins or ethers, such as bis(2-chloroethyl)ether, and the corresponding dihalides of other halogens, including saturated and unsaturated compounds containing up to about 10 carbon atoms.

An additional class of coupling agents operable herein includes the simple difunctional epoxy compounds since the epoxide group is known to be converted by a phenolic hydroxyl group, forming an ether linkage. Preferred epoxy compounds are the epihalohydrins such as epichlorohydrin or epibromohydrin. Also suitable are the oxy-epihalohydrins wherein one of the carbon atoms is replaced by ether oxygen, as illustrated by 2,3-epoxypropyl-2-hydroxy-3-chloropropyl ether.

Reaction of the diphenolic acids with dihalides or epihalohydrins is carried out in the presence of sufficient alkali, such as sodium hydroxide, to neutralize the carboxyl group of the diphenolic acid and to react with the halogen group of the halide or halohydrin. To illustrate, the reaction of one mol of a diphenolic acid with one mol of epichlorohydrin would require 2 mols of sodium hydroxide, one to neutralize the carboxyl group, and one to take up the chlorine ions liberated by epichlorohydrin in the reaction. Similarly, the reaction of two mols of a diphenolic acid with 1 mol of a dichloride would require four mols of sodium hydroxide. Usually, in practice alkali is used somewhat in excess of the theoretical amounts. Such alkaline reactions are conveniently carried out in aqueous solution; however, highly polar organic solvents may be used. These reactions, involving the interaction of halides with sodium phenoxide to form ether linkages, are preferably carried out at temperatures ranging from 75–150°C. Reaction of an active halogen group, such as that in epichlorohydrin, and the simultaneous reaction of its epoxide group with a diphenolic acid to give the polybasic acids might, for example, be carried out at temperatures of from 75–100° C. for periods of 30 minutes to an hour. The reaction of active chlorides, such as 1,4-dichlorobutene, with the sodium phenoxied groups may also be carried out at relatively low temperatures of around 100° C. for short periods of time, of about 1 hour. The use of less reactive halides, such as 1,4-dichlorobutane, on the other hand, requires more vigorous reaction conditions of several hours' heating at about 100° C., or of higher temperatures for shorter periods of time.

A class of coupling agents not mentioned above is that of the simple aliphatic polyepoxides. Their use, however, requires much more care to neutralize the carboxyl group of the diphenolic acid, either by esterification or salt formation, to prevent it from taking part in the reaction. The reaction is conveniently carried out by heating the neutralized diphenolic acid with the polyepoxide at temperatures of from 90–200° C., usually in the absence of any solvent. However, if desired, organic solvents may be used provided they do not contain functional groups which would interfere with the reaction of the epoxide group with the phenolic hydroxyl group. Where simple polyepoxides are reacted with, for example, methyl or ethyl ester of diphenolic acid, it may be desirable to use traces of catalyst, such as boron trifluoride adducts, to speed up reaction of the epoxide group with the phenolic hydroxyl groups.

Examples I to X inclusive illustrate the preparation of the polycarboxylic acids of this invention. It will be noted that the first six examples represent polycarboxylic acids which are free of alcoholic hydroxyl groups, while Examples VII to X inclusive describe the preparation of polycarboxylic acids containing alcoholic hydroxyl groups within the same molecule. Examples V, VI, and X describe the preparation of polycarboxylic acids by the reaction with aliphatic coupling agents of mixtures of a diphenolic acid and a dihydric phenol containing no carboxyl group. These dihydric phenols can be defined as bis(hydroxyaryl)gem alkanes. Proportions expressed expressed refer to parts by weight unless otherwise indicated.

*Example I*

In a reaction vessel provided with a thermometer, a mechanical agitator, and a reflux condenser was added 500 parts of water and 124 parts of sodium hydroxide. With continuous agitation 286 parts of 4,4-bis(4-hydroxyphenyl)-pentanoic acid was added, and after completely dissolved, 63 parts of 1,4-dichlorobutene-2 was added. The continuously agitated mixture was refluxed for 4 hours, after which the excess caustic was neutralized with HCl. The aqueous layer was removed by decantation and the organic acid layer freed from salt by washing four times with hot water. The resinous product was finally freed from the last traces of water by drying in an oven. The resulting product had a softening point of 105° C. (Durrans' Mercury Method, Journal of Oil & Colour Chemists' Association, 12, 173–175 [1929]), and an acid value of 165. Acid value as used herein is defined as the number of milligrams of KOH required to neutralize the acidity of one gram of the sample.

*Example II*

In a similar manner a solution of 286 parts of 4,4-bis(4-hydroxyphenyl)-pentanoic acid dissolved in an aqueous alkali solution prepared from 124 parts of sodium hydroxide and 400 parts of water was refluxed for 6 hours with 64 parts of 1,4-dichlorobutane. After neutralization with HCl and washing free of salt, the product was freed from the last traces of water by heating with continuous agitation until the temperature had risen to 135° C. The resulting product had an acid value of 163 and a softening point of 117° C.

*Example III*

In an autoclave provided with a mechanical agitator was placed 1500 parts of water, 300 parts of sodium hydroxide, 858 parts of 4,4-bis(4-hydroxyphenyl)-pentanoic acid, and 286 parts of bis(2-chloroethyl) ether. The autoclave was closed and the reaction mixture heated with agitation at 150° C. for a period of 5 hours. The reaction mixture was cooled to below 100° C. so as to release pressure and the product was neutralized with HCl. The aqueous layer was removed by decantation and the resinous product washed four times with hot water to remove sodium chloride. The product was finally freed from the last traces of water by heating with continuous agitation to a temperature of 130° C. The product had a softening point of 72° C. and an acid value of 147.

*Example IV*

A mixture of 1144 parts of 4,4-bis(4-hydroxyphenyl)-pentanoic acid, 320 parts of sodium hydroxide, 1500 parts of water, and 286 parts of bis(2-chloroethyl)ether was treated in the manner described in Example III and gave a product having a softening point of 69° C. and an acid value of 164.

*Example V*

Following the procedure of Example III, a mixture of 342 parts of bis(4-hydroxyphenyl)-isopropylidine, 572 parts of 4,4-bis(4-hydroxyphenyl)-pentanoic acid, 358 parts of bis(2-chloroethyl)ether, 1500 parts of water, and 300 parts of sodium hydroxide was heated for 7 hours at 150° C., neutralized, washed, and dried to give a product having a softening point of 59° C. and an acid value of 89.

*Example VI*

A mixture of 228 parts of bis(4-hydroxyphenyl)-isopropylidene, 572 parts of 4,4-bis(4-hydroxyphenyl)-pentanoic acid, 286 parts of bis(2-chloroethyl)ether, 1000 parts water, and 280 parts of sodium hydroxide was treated as in Example III, except that it was heated for 6 hours at 150° C. The product, after neutralization, washing, and drying, had an acid value of 118 and a softening point of 73° C.

*Example VII*

In a flask provided with a thermometer, a mechanical agitator, and a reflux condenser was added 800 parts of water, 80 parts of sodium hydroxide, and 286 parts of 4,4-bis(4-hydroxyphenyl)-pentanoic acid. After the diphenolic acid had all dissolved and at a temperature of 65° C., 75 parts of epichlorohydrin was added. With continuous agitation the temperature was gradually raised to 90° C. and held at 90–95° C. for a period of 1 hour. The product was neutralized with HCl and the aqueous layer removed by decantation. After washing the product four times with hot water to remove the sodium chloride, the product was freed from the last traces of water by heating to a temperature of 110° C. This product had an acid value of 133. Although this product was a hard, brittle solid, softening points as determined on the products of Example I to VI inclusive give inconsistent results due to the fact that some interesterification of the alcoholic hydroxyl groups with the carboxylic acid groups takes place when the product is heated to temperatures of 100° C. or higher.

*Example VIII*

A mixture of 286 parts of 4,4-bis(4-hydroxyphenyl)-pentanoic acid, 800 parts of water, 80 parts of sodium hydroxide and 69 parts of epichlorohydrin, treated as in Example VII, gave a hard, brittle, resinous product having an acid value of 136.

*Example IX*

Following the procedure set forth in Example VII, a mixture of 286 parts of 4,4-bis(4-hydroxyphenyl)-pentanoic acid, 600 parts of water, 60 parts of sodium hydroxide, and 47 parts of epichlorohydrin gave a final product having an acid value of 162 and an initial softening point of 80° C.

*Example X*

A mixture of 191 parts of 4,4-bis(4-hydroxyphenyl)-pentanoic acid, 76 parts of bis(4-hydroxyphenyl)isopropropylidene, 62 parts of epichlorohydrin, 600 parts of water, and 68 parts of sodium hydroxide was treated in the manner set forth in Example VII and gave a product having an acid value of 108 and an initial softening point of 105° C.

The polybasic acids of this invention are resinous in character, possessing relatively high melting points. The carboxyl groups of the subject polycarboxylic acids are esterifiable with either alcoholic hydroxyl groups or epoxide groups. The products thus may find utility in the formulation of alkali-soluble resins for use in combination with other ingredients in making of removable coatings. It has been found that the polycarboxylic acids herein described are soluble in aqueous alkaline solutions usually employed in formulating such products, namely sodium hydroxide, ammonium hydroxide, and borax. A particularly valuable application of the subject polybasic acids has been found to be in the co-conversion products formed by the application of heat to combinations of these acids with various polyepoxides of the resinous or non-resinous types. Condensation products of the polycarboxylic acids, for example, with complex resinous epoxides prepared by the condensation of epichlorohydrin with polyhydric phenols, produce infusible, insoluble products of great commercial value as adhesives, protective coatings, and molded objects. A co-conversion product derived from the subject polycarboxylic acid and an epoxidized vegetable oil exhibits outstanding properties, being hard, flexible and highly resistant to water, alkali, and hydrocarbon solvents. These products have the added advantage of being capable of conversion during the film baking process, both through the olefin linkages and by esterification of the epoxide group.

The following example illustrates a method of preparing a typical co-conversion product, and its utility and properties as a film.

*Example XI*

Admex 710 (Archer-Daniels-Midland Company), an epoxidized soya bean oil, having an epoxide equivalent weight of 263, was dissolved in methyl ethyl ketone to a nonvolatile content of 50%. A mixture of 3.7 parts of this composition and 5 parts of the polycarboxylic acid of Example I, spread in thin films and heat treated for a period of 1 hour at 175° C., were tack-free and flexible. The film showed no deterioration on exposure to 5% aqueous sodium hydroxide for a period of 35 minutes or on exposure to boiling water for a period of 6 hours.

While there are above disclosed but a limited number of embodiments of the product of the invention herein presented, it is possible to produce still other embodiments without departing from the inventive concept herein disclosed.

What is claimed is:

1. A resinous polycarboxylic acid ether having aliphatic chains alternating with and connected by ether oxygen to residues of a pentanoic acid obtained by the removal of the phenolic hydroxyl, said pentanoic acid consisting essentially of 4,4-bis(4-hydroxyaryl)pentanoic acid wherein the hydroxyaryl radical is hydroxyphenyl and is free from substituents other than alkyl groups of from 1–5 carbon atoms, said aliphatic chains being selected from the group consisting of hydrocarbon, oxyhydrocarbon, β-hydroxyl substituted hydrocarbon, and β-hydroxyl substituted oxahydrocarbon radicals of 2–10 carbon atoms, said β-position being relative to said ether oxygen.

2. The composition of claim 1 wherein the pentanoic acid consists essentially of 4,4-bis(4-hydroxyaryl)pentanoic acid wherein the hydroxyaryl radical is hydroxyphenyl and is free from substituents other than alkyl groups of one carbon atom.

3. The composition of claim 1 wherein the pentanoic acid is 4,4-bis(4-hydroxyphenyl)pentanoic acid.

4. A resinous polycarboxylic acid ether prepared by reacting (1) epichlorohydrin and (2) 4,4-bis(4-hydroxyphenyl)pentanoic acid in an alkaline medium, said ether containing only functional groups selected from the group consisting of carboxyl and hydroxyl.

5. A resinous polycarboxylic acid ether prepared by reacting (1) dichloroethyl ether and (2) 4,4-bis(4-hydroxyphenyl)pentanoic acid in an alkaline medium, said ether containing only functional groups selected from the group consisting of carboxyl and hydroxyl.

6. A resinous polycarboxylic acid ether prepared by reacting (1) 1,4-dichlorobutane and (2) 4,4-bis(4-hydroxyphenyl)pentanoic acid in an alkaline medium, said ether containing only functional groups selected from the group consisting of carboxyl and hydroxyl.

7. A resinous polycarboxylic acid ether prepared by reacting (1) 1,4-dichlorobutene and (2) 4,4-bis(4-hydroxyphenyl)pentanoic acid in an alkaline medium, said ether containing only functional groups selected from the group consisting of carboxyl and hydroxyl.

8. A resinous composition of matter having the general formula

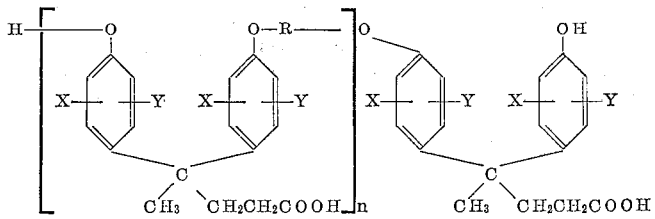

wherein X and Y are members selected from the group consisting of hydrogen and alkyl groups of from 1 to 5 carbon atoms; R is an aliphatic divalent radical selected from the group consisting of hydrocarbon, oxahydrocarbon, β hydroxyl substituted hydrocarbon, and β hydroxyl substituted oxahydrocarbon radicals of 2–10 carbon atoms, said β position being relative to said ether oxygen, and $n$ has a value of less than about 15.

9. A resinous polycarboxylic acid ether having aliphatic chains alternating with and connected by ether oxygen to residues obtained by the removal of phenolic hydroxyls from a pentanoic acid and also from a bis(hydroxyphenyl) gem alkane, said pentanoic acid consisting essentially of 4,4-bis(4-hydroxyaryl)pentanoic acid wherein the hydroxyaryl radical is hydroxyphenyl and is free from substituents other than alkyl groups of from 1–5 carbon atoms, the residues of said bis(hydroxyphenyl)gem alkane containing only the elements carbon and hydrogen; said aliphatic chains being selected from the groups consisting of hydrocarbon, oxahydrocarbon, β hydroxyl substituted hydrocarbon, and β hydroxyl substituted oxahydrocarbon radicals of 2–10 carbon atoms, said β position being relative to said ether oxygen.

10. A method of preparing a resinous polycarboxylic acid ether comprising heating a dichloro alkane of from 2–10 carbon atoms with a pentanoic acid consisting essentially of 4,4-bis(4-hydroxyaryl)pentanoic acid wherein the hydroxyaryl radical is hydroxyphenyl and is free from substituents other than alkyl groups of from 1–5 carbon atoms in an alkaline medium of sufficient strength to form a salt of a phenolic hydroxyl group.

11. A method of preparing a resinous polycarboxylic acid ether comprising heating an epihalohydrin with a pentanoic acid consisting essentially of 4,4-bis(4-hydroxyaryl)pentanoic acid wherein the hydroxyaryl radical is hydroxyphenyl and is free from substituents other than alkyl groups of from 1–5 carbon atoms in an alkaline medium of sufficient strength to form a salt of a phenolic hydroxyl group.

12. A method of preparing a resinous polycarboxylic acid ether comprising heating a bis(haloalkyl)ether of from 2–10 carbon atoms with a pentanoic acid consisting essentially of 4,4 - bis(4 - hydroxyaryl)pentanoic acid wherein the hydroxyaryl radical is hydroxyphenyl and is free from substituents other than alkyl groups of from 1–5 carbon atoms in an alkaline medium of sufficient strength to form a salt of a phenolic hydroxyl group.

13. A resinous composition of matter having the general formula

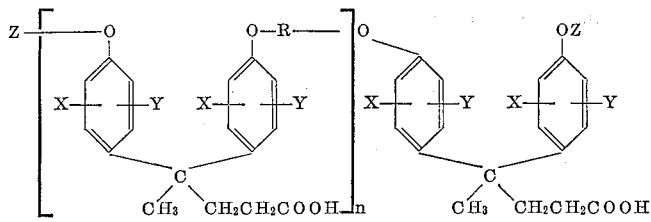

wherein X and Y are members selected from the group consisting of hydrogen and alkyl groups of from 1–5 carbon atoms; R is an aliphatic divalent radical selected from the group consisting of hydrocarbon, oxahydrocarbon, β-hydroxyl substituted hydrocarbon, and β-hydroxyl substituted oxahydrocarbon radicals of 2–10 carbon atoms, said β position being relative to said ether oxygen; Z is a member of the group consisting of hydrogen and Cl—R— wherein R is as above defined and $n$ has a value of less than about 15.

14. A polymeric condensation product prepared by reacting (1) dichloroethyl ether and (2) 4,4-bis(4-hydroxyphenyl)pentanoic acid in an alkaline medium, said product containing only functional groups selected from the group consisting of carboxyl and hydroxyl.

References Cited by the Examiner

UNITED STATES PATENTS 2,331,265  10/1943  Coleman et al. _____ 260—47
2,694,694  11/1954  Greenlee _____ 260—17

WILLIAM H. SHORT, *Primary Examiner.*

MILTON STERMAN, PHILIP E. MANGAN,
*Examiners.*

G. KANTOROW, R. J. BUTTERMARK, J. C. MARTIN, J. T. BROWN, *Assistant Examiners.*